United States Patent [19]

Weinstein

[11] Patent Number: 5,127,553

[45] Date of Patent: Jul. 7, 1992

[54] METERED LIQUID SQUEEZE BOTTLE

[75] Inventor: Jack Weinstein, Manchester Township, Ocean County, N.J.

[73] Assignee: Primary Delivery Systems, Inc., Easton, Pa.

[21] Appl. No.: 583,951

[22] Filed: Sep. 17, 1990

[51] Int. Cl.$^5$ ............................................. B67D 5/38
[52] U.S. Cl. .................................. 222/158; 222/207; 222/211; 222/420
[58] Field of Search .............. 222/205, 207, 209, 211, 222/158, 420, 454, 456; 141/320, 322; 239/327

[56] References Cited

U.S. PATENT DOCUMENTS

| | | | |
|---|---|---|---|
| 2,730,270 | 1/1956 | Heinemann | 222/205 |
| 2,942,762 | 6/1960 | Fahr | 222/207 |
| 2,979,236 | 4/1961 | Fahr | 222/207 |
| 2,989,216 | 6/1961 | Moro-Lin | 222/211 X |
| 3,203,454 | 8/1965 | Micallet | 222/205 X |
| 3,347,420 | 10/1967 | Donoghue | 222/158 X |
| 3,628,700 | 12/1971 | Donoghue | 222/211 X |
| 3,878,972 | 4/1975 | Por | 222/207 |
| 4,077,547 | 3/1978 | Donoghue | 222/207 |
| 4,162,749 | 7/1979 | Bennett | 222/207 X |
| 4,190,180 | 2/1980 | Bennet | 222/207 |
| 4,211,346 | 7/1980 | Mehra | 222/205 |
| 4,625,897 | 12/1986 | Wortley | 222/205 |
| 4,779,767 | 10/1988 | Griffiths | 222/205 |

FOREIGN PATENT DOCUMENTS

| | | | |
|---|---|---|---|
| 383644 | 8/1990 | European Pat. Off. | 222/205 |
| 1075967 | 2/1960 | Fed. Rep. of Germany | 222/158 |
| 3819098 | 1/1989 | Fed. Rep. of Germany | 222/211 |
| 7613833 | 12/1976 | Netherlands | 222/205 |
| 7712828 | 5/1979 | Netherlands | 222/207 |
| 110059 | 8/1960 | Pakistan | 222/205 |

Primary Examiner—Gregory L. Huson
Attorney, Agent, or Firm—Kenneth P. Glynn

[57] ABSTRACT

The present inventon is a liquid metered dispensing container of the squeezable type. The squeezable container has an opening for dispensing liquid therefrom at one end and a bottom at the other end. A non-flexible trap chamber is connected to the opening and extends outwardly therefrom. The trap chamber has a lower end inserted into the container opening and has an inlet orifice extending from the lower end into the container. The inlet orifice is adapted to receive a dip tube which is attached thereto and extends close to or at the bottom of the container. The trap chamber has an upper end with a dispensing orifice. This is small enough to prevent dripping of liquid therefrom by gravity when the bottle is inverted but is large enough to dispense liquid therefrom when the bottle itself is squeezed. A one way valve is connected to the lower end of the trap chamber which permits liquid to flow from the container to the trap chamber but not vice versa. The trap chamber may have indicia so that exact dosage levels of different amounts may be squeezed into the chamber, or the chamber itself may have a single, predetermined volume.

6 Claims, 3 Drawing Sheets

METERED LIQUID SQUEEZE BOTTLE

BACKGROUND OF THE INVENTION

1. Field of the Invention

The present invention is directed to a liquid type squeeze bottle for dispensing metered amounts of a liquid material. More specifically, it is directed to such dispensers wherein the squeeze bottle is filled to a desired dosage level in its upright position and then squeezed a second time in its inverted position to dispense the liquid which has been preselected and previously squeezed into a dispensing chamber.

2. Prior Art Statement

Numerous liquid dispensing devices have been developed over the years and containers using dip tubes have been around for a number of decades. Most of these rely upon a two step technique involving the squeezing of a flexible container for movement of liquid through the dip tube into a secondary chamber at the top of the container, followed by a second action involving depression or squeezing of the top of the container to force the liquid out of the secondary chamber. For example, U.S. Pat. No. 2,942,762 issued on Jun. 29, 1960 to Morris Fahr describes a dispensing unit for toilet lotions which includes a dip tube within a flexible container, wherein the dip tube is connected to a cap which includes a one way ball valve which permits squeezing of the liquid in the container through the ball valve and into a chamber at the top. After the liquid has been squeezed into the top chamber, the user depresses the top of the container to force out the desired lotion. This container does not have a dispensing system which involves the squeezing of the container itself in two steps as is done in the present invention. U.S. Pat. No. 2,979,236, also issued to Morris Fahr, describes a very similar dispenser but with a rather unusual top which is designed for downward squeezing to dispensing a liquid which has already been squeezed up into the upper chamber.

U.S. Pat. No. 3,878,972 describes a liquid measuring and dispensing apparatus which involves a rather complex arrangement with a dip tube, ball and spring with a side vent arrangement. This complicated dispensing unit requires intricate casting of the container parts.

U.S. Pat. No. 4,077,547 issued to Robert Donahue on Mar. 7, 1978 describes a measuring and dispensing apparatus for use with a squeeze container which has an enlarged cylindrical base portion and upstanding portion which has a lower end in the base portion and the upper end at the outlet, wherein the upper end thereof has orifices through which liquid may be squeezed so that an "overflow" chamber type arrangement is utilized.

U.S. Pat. No. 4,162,749 issued on Jul. 31, 1979 to Robert Bennett describes a squeezable dispenser with an outlet closure which is used with a flexible container wherein the dispenser, has only two main parts plus a ball and dip tube. However, special venting and a complicated cap is required. Likewise, U.S. Pat. No. 4,190,180 issued on Feb. 25, 1980 to Robert Bennett describes another rather complex liquid dispenser system utilizing a dip tube. Again, a rather unusual and complicated cap is required.

U.S. Pat. No. 4,211,346 issued on Jul. 8, 1980 to Ravinder Mehra et al describes a variable volume dispensing bottle with a push/pull closure and includes a squeeze dip tube type arrangement. Again, this requires a complex cap in order to function properly.

U.S. Pat. No. 4,625,897 issued to Michael Wortley on Dec. 2, 1986 describes a metering dispenser utilizing a cup type arrangement in the cap of the squeeze container, with a dip tube and with a valve which permits filling of the cup and subsequent removal of the cap for dispensing therefrom.

Finally, U.S. Pat. No. 4,779,767 issued on Oct. 25, 1988 to Daniel J. Griffiths describes a premeasure dispensing device for fluids which utilizes a dip tube and ball arrangement, except that the dip tube extends to the top of a secondary chamber rather than to the bottom as is described in other prior art devices. Additionally, the ball valve is utilized at the very top of the chamber to facilitate dispensing of a premeasured amount.

Notwithstanding the formidable prior art described above, none of these patents teach or render obvious the concept of a dispensing unit with a dip tube and valving to allow a metered amount by squeezing and then final dispensing by inversion and subsequent squeezing of the main container as in the present invention.

SUMMARY OF THE INVENTION

The present invention is directed to a liquid metered dispensing bottle of the squeezable type. A squeezable container has an opening for dispensing liquid therefrom at one end and a bottom at the otehr end. A non-flexible trap chamber is connected to the opening of the container and extends outwardly therefrom. The trap chamber has a lower end which is inserted into the container opeining and has an inlet orifice extending from the lower end into the container. This inlet orifice is adapted to receive a dip tube and dip tube is attached thereto and extending close to or at the bottom of the container. The trap chamber has an upper end with a dispensing orifice. This is small enough to prevent dripping of liquid therefrom by gravity when the bottle is inverted but is large enough to dispense liquid therefrom when the bottle itself is squeezed. A one way valve is connected to the lower end of the trap chamber which permits liquid to flow from the container to the trap chamber but not vice versa. Basically, the bottle is squeezed in its upright position and liquid is forced inot the trap chamber. The trap chamber may have indicia so that exact dosage levels of different amounts may be squeezed into the chamber, or the chamber itself may have a single, predetermined volume. After the bottle is squeezed upright to move the metered amount of liquid into the trap chamber, the bottle is inverted and squeezed a second time. Air trapped in the inverted bottom of the container goes down the dip tube and forces the liquid in the trap chamber out of the outlet orifice for dispensing.

BRIEF DESCRIPTION OF THE DRAWINGS

The present invention will be more fully appreciated when the specification herein is taken in conjunction with the appended drawings, wherein.

DETAILED DESCRIPTION OF THE PRESENT INVENTION

The present invention liquid metered dispensing bottle is one which may be operated in two simple steps. First, the user holds the squeezable container in its normal, upright position and squeezes the side walls so as to force liquid up a dip tube and into a trap chamber. A valve keeps the liquid that has been move into the chamber from draining back into the container. Second, the user merely inverts the container and the air pocket which now rises to the inverted bottom creates a buffer between the trap chamber liquid and the remaining liquid in the bottle. When the container is squeezed in this inverted position, air is forced down the dip tube and forces out the metered amount of liquid.

The present invention device may involve any type of squeezable container and the trap chamber is generally non-flexible so as to not distort the predetermined volume thereof. While not a critical feature of the present invention, the liquid metered dispensing bottle may include some type of lid of cover and this may be a pop-in, a flip top, a screw cap, a snap cap or any other type of closure which is known to the art. These would include, but not be limited to child proof type closures, as the product may dictate.

Figure 1:
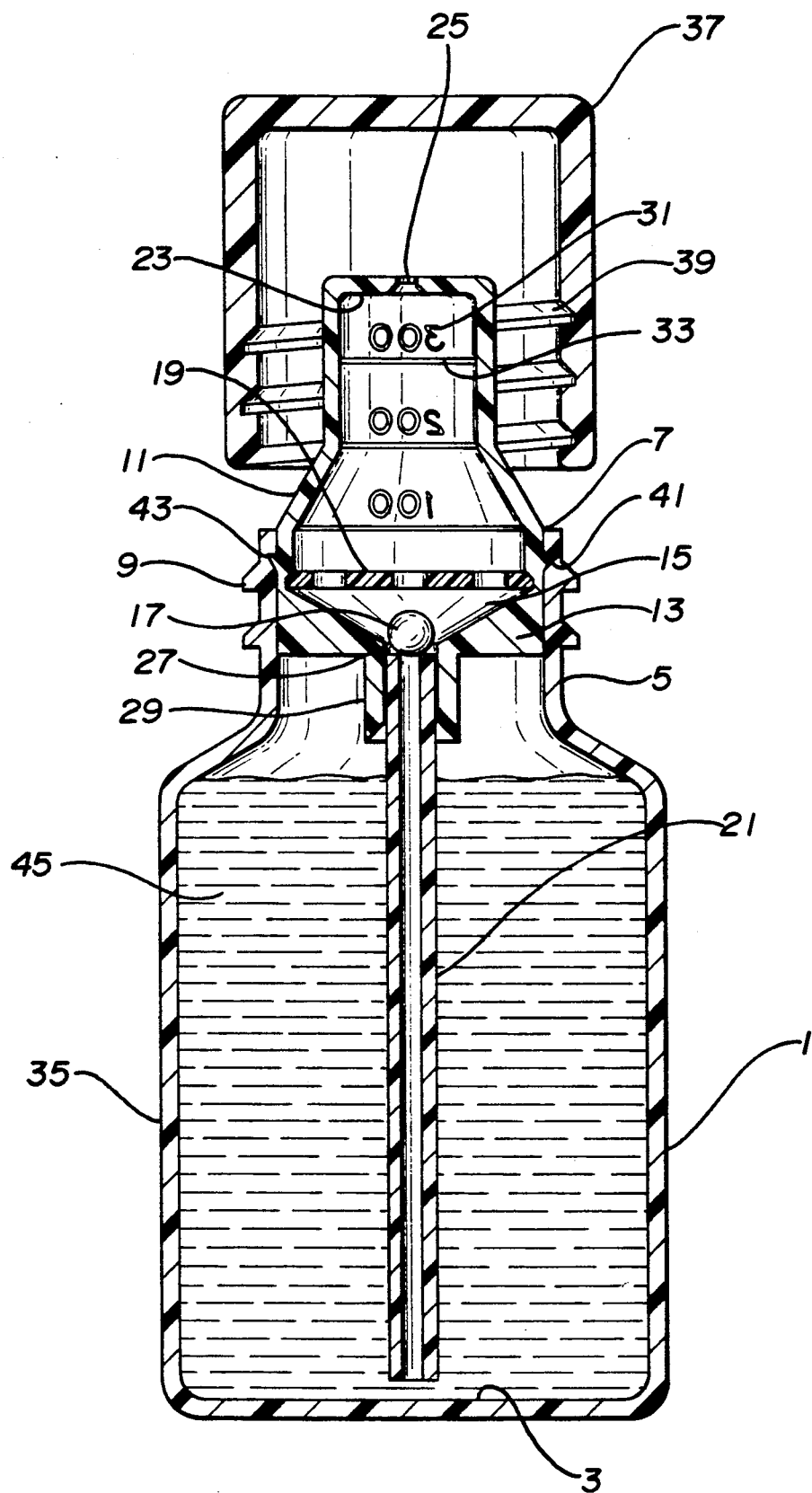
FIG. 1 shows a side cut view of a liquid metered dispensing bottle with liquid contained therein.

Referring now to FIG. 1, there is shown squeezable container 1 which has a container bottom 3 and a container neck 5. Container neck 5 has container opening 7 and also has container threads 9. These container threads 9 are optional in this case and are used in conjunction with cap 37. Trap chamber 11 has a lower end 13 as shown and, in this case, due to the nature of the valving, has a tappered bottom 15 with a valve ball 17 and an inlet orifice 27. Screen 19 is also included and this is used to keep valve ball 17 in the lower portion of trap chamber 11. Inlet orifice 27 has an extension 29 which is adapted to receive a dip tube and dip tube 21 is inserted therein, as shown. The dip tube 21 extends nearly to the bottom 3 of squeezable container 1, but could actually extend all the way to the bottom and lay on the bottom.

Trap chamber 11 also has an upper end 23 with dispensing orifice 25, as shown. Dispensing orifice 25 is small enough to prevent dripping of liquid therefrom by gravity when the dispensing bottle is inverted but large enough to dispense liquid therefrom when the container is inverted and squeezed. The exact diameter of the orifice will be dictated by the viscosity of the liquid 45 contained in sqeezable container 1, and this is well within the skill of the artisan. Further, trap chamber 11 may be of a specific volume so as to meet a single or double dosage requirement, or it may be graded with indicia to indicate different predetermined or metered volumetric amounts. In this particular embodiment, level lines such as liquid level line 33 and indicia such as the "3 cc" shown as indicia 31.

Cap 37 includes cap threads 39 which are designed to be coincidental with squeezable container threads 9. As mentioned above, any closure may be utilized without exceeding the scope of the present invention.

Trap chamber 11 may be inserted into the opening 7 of a squeezable container 1 by any known mechanism and may be heat welded, glued, irreversibly screwed in, irreversibly snapped in, or the like. In its particular embodiment, snap lock female componant 41 is located on the inside of neck 5 while snap lock male component 43 is located on the outside of trap chamber 11. When trap chamber 11 is pushed into opening 7, female component 41 and male component 43 interlock.

Figure 2:
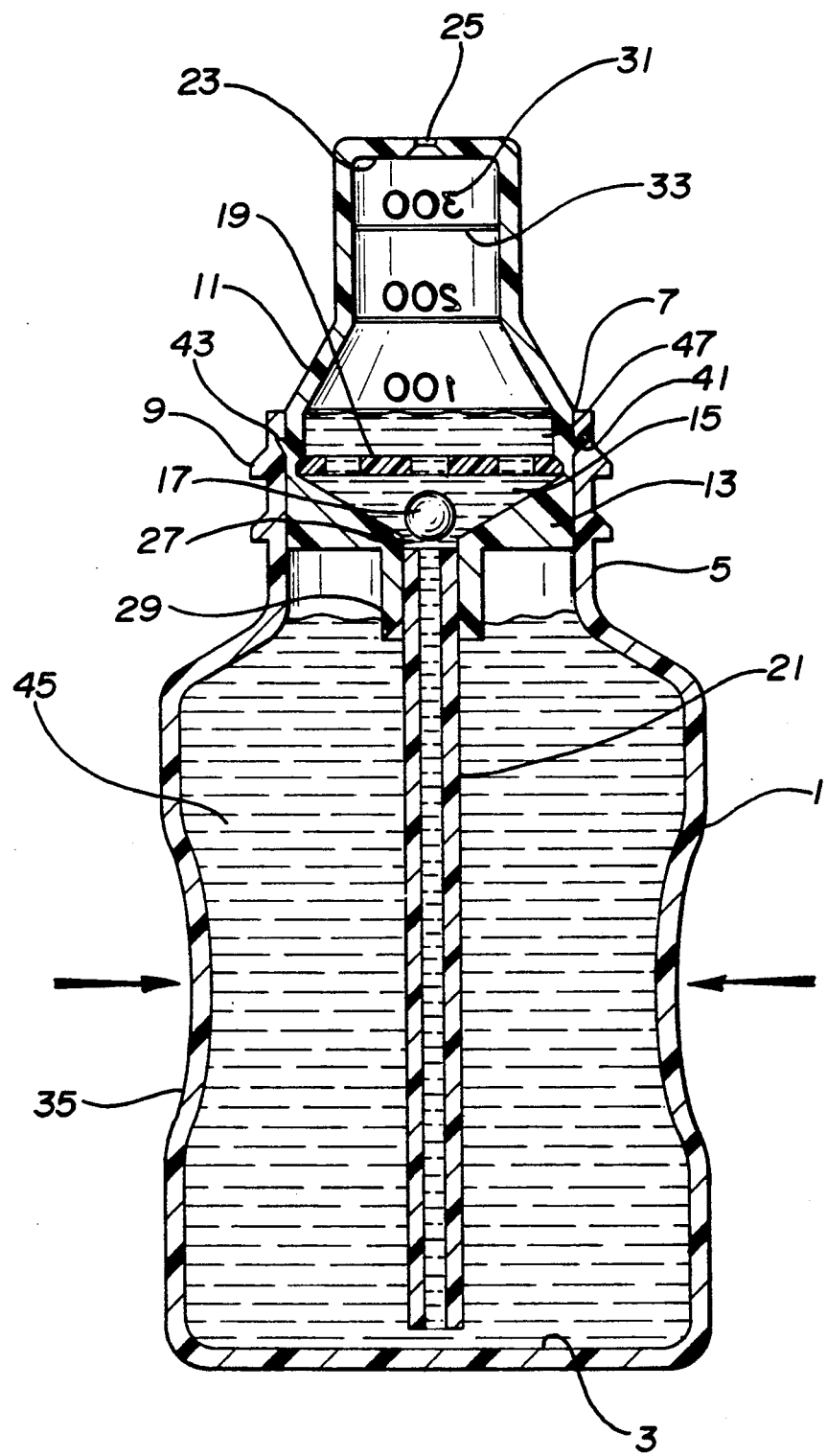
FIG. 2 shows a side cut view of a bottle of FIG. 1 with the cap removed and the side wall being squeezed with liquid filling the trap chamber.
Figure 3:
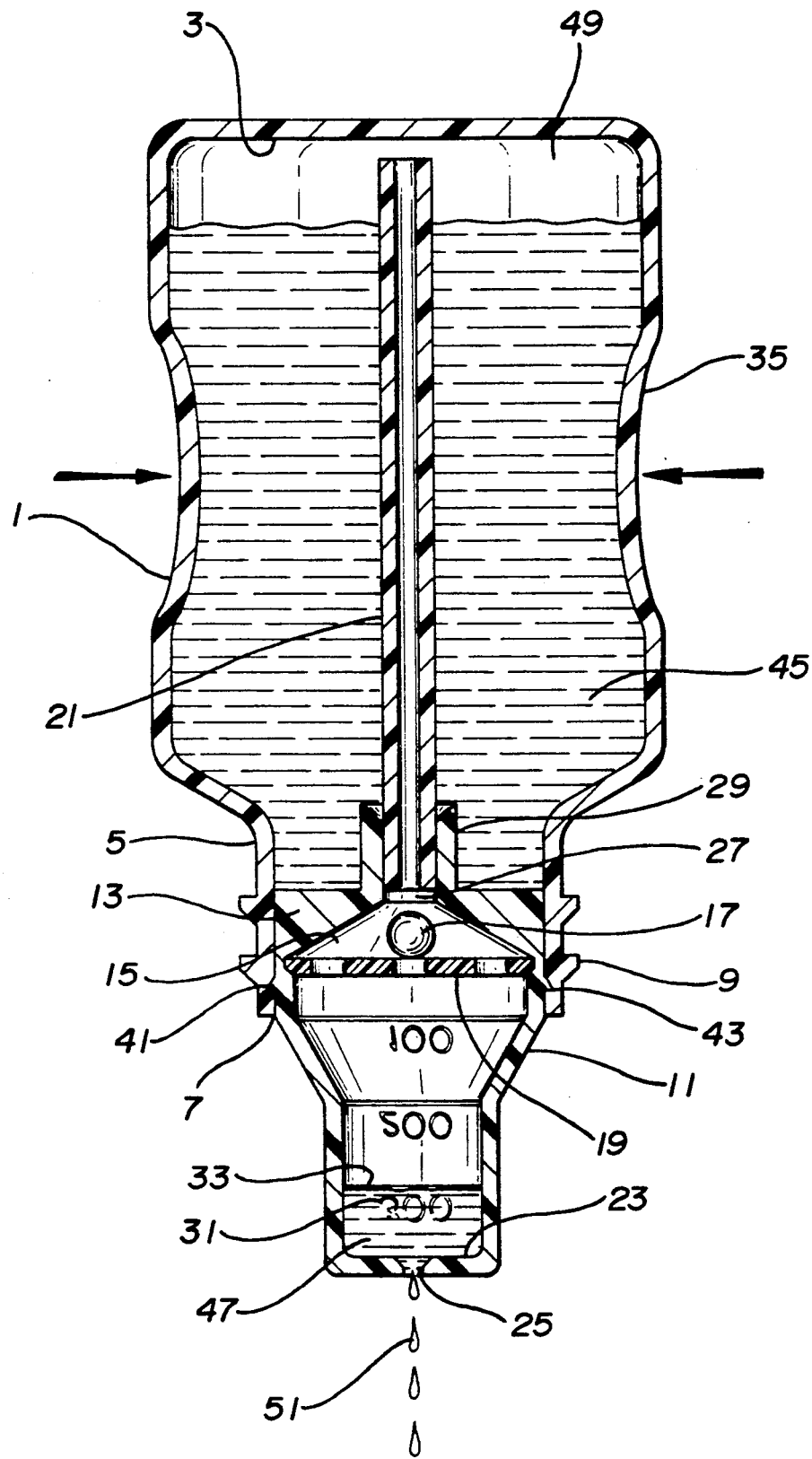
FIG. 3 shows a side cut view of a bottle of FIG. 2 but inverted and being squeezed a second time for dispensing of a metered amount of liquid.

Referring now to both FIGS. 2 and 3, it should be noted that like parts are like numbered. In FIG. 2, squeezable container 1 is shown in an upright, squeezed position. Arrows are shown for the direction of squeezing to simplify the diagram. As squeezable container 1 is squeezed, liquid 45 is forced up to 21 into the lower end 13 of trap chamber 11, as shown. The valve ball 17 will be pushed up during squeezing and will be pulled back down to seal the liquid in trap chamber 11 when squeezing ceases. Screen 19 keeps valve ball 17 from being pushed to far up and, when this is discussed in conjunction with FIG. 3, the screen deeps the valve ball from blocking dispensing orifice 25. Metered amount of liquid 47 is shown in trap chamber 11, and in this embodiment the trap chamber may be filled to 1 cc, 2 cc, or 3 cc's, as shown thereon, or to 4 cc's, being a full trap chamber. Obviously, any gradation or no gradation at all may be utilized as the particular liquid product manufacturer may require.

FIG. 3 shows squeezable container 1 in its inverted position and being squeezed a second time as shown by the arrows. In this instance, air space 49 separates the liquid 45 from the liquid 47 in the trap chamber. As squeezable container 1 is squeezed, air from air space 49 moves down dip tube 21 and pushes liquid 47 through dispensing orifice 25 and resulting dispensed liquid 51 is dispensed in a predetermined, metered amount. Screen 19 prevents valve ball 17 from blocking dispensing orifice 25, as shown. Gravity removes valve ball 17 from obscuring dip tube 21 and the single squeeze action while the bottle is inverted, after the trap chamber has been filled to the desired amount, results in a predetermined, metered amount of dispensed liquid.

Obviously, numerous modifications and variations of the present invention are possible in light of the above teachings. It is therefore understood that within the scope of the appended claims, the invention may be practiced otherwise than as specifically described herein.

What is claimed is:

1. A liquid metered dispensing bottle comprising:
  (a) a squeezable container having an opening for dispensing liquid therefrom at one end and a bottom at the other end;
  (b) a nonflexible trap chamber of a predetermined volume connected to said opening of said container, said trap chamber having a lower end which is inserted into said container opening and having an inlet orifice extending from said lower end and into said container and adapted to receive a dip tube, said trap having an upper end with a dispensing orifice, said dispensing orifice having a diameter small enough to prevent dripping of a liquid therefrom by gravity when inverted but being large enough to dispense liquid therefrom when said container is inverted and squeezed the exact diameter of the orifice being dictated by the viscosity of the liquid;
  (c) a dip tube received in said inlet orifice and extending downwardly into said container at or near the bottom of said container; and,
  (d) a one way valve connected to the lower end of said trap chamber which permits liquid to flow from the container into the trap chamber but not from said trap chamber to said container.

2. The liquid metered dispensing bottle of claim 1 wherein said trap chamber has indicia which indicate predetermined volume levels.

3. The liquid metered dispensing bottle of claim 1 wherein said nonflexible trap chamber has either the male or female portion of a snap-in lock for permanent insertion into the opening of said container and said container has the other of the male or female portion of said snap-in lock.

4. The liquid metered dispensing bottle of claim 1 wherin said squeezable container contains a liquid for dispensing which fills the container to a predetermined level below said trap chamber to create an air space therebetween.

5. The liquid metered dispensing bottle of claim 1 wherein said one way valve is a ball valve with a grid to prevent the ball from contacting and blocking said dispensing orifice.

6. The liquid metered dispensing bottle of claim 5 wherein said trap chamber has indicia which indicate predetermined volume levels.

* * * * *